(12) United States Patent
Del Pinto et al.

(10) Patent No.: US 12,195,650 B2
(45) Date of Patent: Jan. 14, 2025

(54) PRE-FORMED ADHESIVE FILM AND METHOD FOR MAKING SAME

(71) Applicant: Safran Cabin Inc., Huntington Beach, CA (US)

(72) Inventors: James Del Pinto, Huntington Beach, CA (US); Marie De la Cruz, Huntington Beach, CA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 0 days.

(21) Appl. No.: 17/734,415

(22) Filed: May 2, 2022

(65) Prior Publication Data

US 2023/0039559 A1 Feb. 9, 2023

Related U.S. Application Data

(60) Provisional application No. 63/229,905, filed on Aug. 5, 2021.

(51) Int. Cl.
| | |
|---|---|
| *B32B 3/10* | (2006.01) |
| *C09J 7/35* | (2018.01) |
| *C09J 9/00* | (2006.01) |

(52) U.S. Cl.
CPC . *C09J 7/35* (2018.01); *C09J 9/00* (2013.01); *C09J 2203/35* (2020.08); *C09J 2301/204* (2020.08); *C09J 2301/21* (2020.08); *C09J 2301/304* (2020.08)

(58) Field of Classification Search
None
See application file for complete search history.

(56) References Cited

U.S. PATENT DOCUMENTS

| | | | | |
|---|---|---|---|---|
| 2015/0375443 A1* | 12/2015 | Suzuki | ................ | B29C 66/022 156/196 |
| 2020/0047868 A1* | 2/2020 | Young | ................ | B32B 7/12 |

FOREIGN PATENT DOCUMENTS

| | | |
|---|---|---|
| JP | 2015066792 A * | 4/2015 |
| JP | 2017205962 A * | 11/2017 |

OTHER PUBLICATIONS

Machine translation of JP2017205962 (Year: 2017).*
Machine translation of JP2015066792A (Year: 2015).*

* cited by examiner

*Primary Examiner* — Christopher M Polley
(74) *Attorney, Agent, or Firm* — Kilpatrick Townsend & Stockton LLP

(57) ABSTRACT

A method for pre-forming adhesive films before applying such films to curved and/or irregular shapes inside an aircraft. Adhesive film blanks with antimicrobial properties are pre-formed using a contoured manufacturing mold. The adhesive film blank has been created to match the shape of the airline interior component to which such adhesive film will be applied. The adhesive film blank is pre-formed by placing it in the contoured manufacturing mold, applying heat for a specified time and at a specified pressure. After being pre-formed in the manufacturing mold, the pre-formed adhesive film is applied to a specific interior component. Commercial aircraft interior components may include, but are not limited to, items such as overhead stowage bins, sidewall panels, ceiling panels, monuments, lavatories, closets, handles, tray tables, galley surfaces, and any other appropriate high touch interior surfaces that benefit from application of a pre-formed adhesive film.

9 Claims, 3 Drawing Sheets

PRE-FORMED ADHESIVE FILM AND METHOD FOR MAKING SAME

CROSS REFERENCE TO RELATED APPLICATIONS

This application is related to and claims priority benefits from U.S. Provisional Application Ser. No. 63/229,905, filed on Aug. 5, 2021, entitled "Pre-Formed Adhesive Film and Method for Making Same," the entire contents of which are hereby incorporated in its entirety by this reference.

FIELD OF THE INVENTION

The present disclosure relates generally to pre-formed adhesive films for application to curved or irregular surfaces. The adhesive films are generally pre-formed to match or closely correspond to the shape of the component to which the film will be applied. The film is provided to the end user in the pre-formed shape. The films described herein can help limit the transmission of viruses and bacteria. Specific embodiments find particular use in connection with application to aircraft interior components, and more particularly, to limiting the transmission of viruses and bacteria in the interior space of an aircraft through the application of pre-formed antimicrobial adhesives to aircraft interior components.

BACKGROUND

Commercial airline operations have been disrupted by the COVID 19 crisis. Airline passenger trips have reduced significantly, causing a financial crisis in the industry. Other instances of air-borne transmittable diseases can also affect the airline industry. Passengers can be afraid to fly due to viruses living on the surfaces that passengers and aircraft personnel often touch during flight, reducing passenger confidence and willingness to travel.

Airlines are thus interested in developing and deploying technology, products, and solutions that will clean, sanitize, disinfect, or even sterilize the aircraft interior before, during, or after flight. Some solutions include wiping surfaces with cleaning liquids, replacing the materials used in high-touch surface areas with materials that have anti-microbial properties, adding films to high touch surfaces with anti-microbial properties, or using UVC lights as pathogen killing devices.

Although many concepts are being developed and proposed to airline operators that kill pathogens, such as the COVID 19 corona virus, there is still a need to ensure these technologies, products, or solutions also meet the industry needs of economy, efficiency and safety at the same time. Moreover, commercial products are being adapted for use on the aircraft, but these products may not meet the industry requirements to allow them to fly or to be certified as airworthy. As background, aircraft flying in commercial service have to be fuel efficient and safe to fly. Airframe manufacturers and their suppliers, in cooperation with government regulators, such as the Federal Aviation Administration (FAA) in the United States and the European Union Aviation Safety Agency (EASA), have developed procedures, regulations, processes and certification requirements in order to ensure that products that are introduced into the aircraft are safe. The FAA has certification requirements that must be met in order for an interior component, for example, to be installed in an aircraft. (Herein the FAA will be used as the exemplary governmental regulatory agency or administration.) To be certified as airworthy, equipment installed on the aircraft must meet all applicable requirements of the certifying airworthiness authority.

There are companies that design, manufacture, certify and sell commercial aircraft interior components. Examples of such interior components include, but are not limited to, overhead storage bins, sidewall panels, ceiling panels, and other high touch interior surfaces. High touch interior surfaces may include, but are not necessarily limited to aircraft galleys, lavatories, closets, handles, tray tables, galley surfaces, and/or other surfaces, and/or other monuments. In order to lessen the transmission of viruses and bacteria, such interior components may be covered by an antimicrobial film that will reduce the transmission of viruses and bacteria between passengers traveling on commercial aircraft. In instances in which the interior components are already mounted on an aircraft and are certified under applicable airworthiness requirements, replacement or refurbishment materials must also meet all such applicable airworthiness requirements and be economical to install.

Applying a film to a product at the time of its manufacturing is a straight-forward process. However, currently, when an airframe manufacturer or airline wants to replace or refurbish an interior component with new decorative laminates on the interior surfaces in the aircraft, they must strip the older material out, clean the panel (or interior component), and then install the new decorative laminate on the surface using contact adhesives or pressure sensitive adhesives, or tape. The decorative laminate material is typically a thermoplastic film, or a laminate of multiple films. The decorative laminate material is trimmed to the rough size of the panel (or interior component) and then installed (usually by hand) by aligning the film with a side or corner of the interior component and methodically working the material down on the surface and over the physical area. A heat gun in conjunction with a Teflon or nylon paddle can be used to facilitate the installation. Heating the material softens it and allows it to stretch and conform better to the interior component shape. The Teflon or nylon paddle is used as an intensifier, applying direct pressure to the surface for a better installation.

These known methods of applying adhesive films or laminate material to interior components that are already installed in the aircraft have limited effectiveness. The state of the art is to apply the material directly from the roll it is provided on to the interior component with a heat gun. However, the material on the roll is typically provided as a flat, straight sheet of material, and the interior component to which it will be applied is not always a flat, straight surface. The current application process is unable to compensate for the curved or irregular shape of the interior component and the criteria that the applied adhesive must comply with all applicable airworthiness requirements. Additionally, due to decorative patterns misaligning—the material must often be stripped and redone several times to get a satisfactory installation, which causes further time and scrapping of materials. It is also possible that, even when the application process is done as well as possible, small bubbles or overlaying wrinkles may be present due to the mis-shape between the material vs. the interior component to which it is applied. Improvements to laminates and their application to interior components is thus desirable.

SUMMARY

The terms "disclosure," "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Many interior component surfaces that will require decorative laminates to be applied as described above in order to replace or refurbish the existing decorative laminate may benefit from the application of a laminate that is treated with or otherwise has antimicrobial, antibacterial, and/or antiviral properties. The use of this type of laminate can help lessen the transmission of viruses and bacteria when applied to an interior component. As discussed above, many of the interior components to be refurbished with overlay films or laminates of this type have a curved and/or irregular shape. Therefore, the present inventors have developed a solution that allows an easy application of a decorative laminate with antimicrobial and/or antiviral properties to be easily and economically applied to an interior component with a a curved and/or irregular shape, with the solution complying with all applicable airworthiness regulations.

Antimicrobial properties can be present on the pre-formed decorative laminate. These properties may be provided in the adhesive film blank prior to forming, due to the chemical nature of such pre-formed decorative laminate or adhesive film blank, having antimicrobial, antibacterial, and/or antiviral properties materials embedded inside, or due to the surface construction of the film, where the surface through its surface topography captures microbes, or enables efficient wiping during cleaning due to its wetting properties, or the antimicrobial nature can be a combination of the above features.

BRIEF DESCRIPTION OF THE DRAWINGS

FIG. 1 is a diagram of a contoured manufacturing mold, in the closed position, demonstrating the shape of the interior component which the film will be applied to;

Like numerals refer to like parts throughout the several views of the drawings.

DETAILED DESCRIPTION

Figure 1:
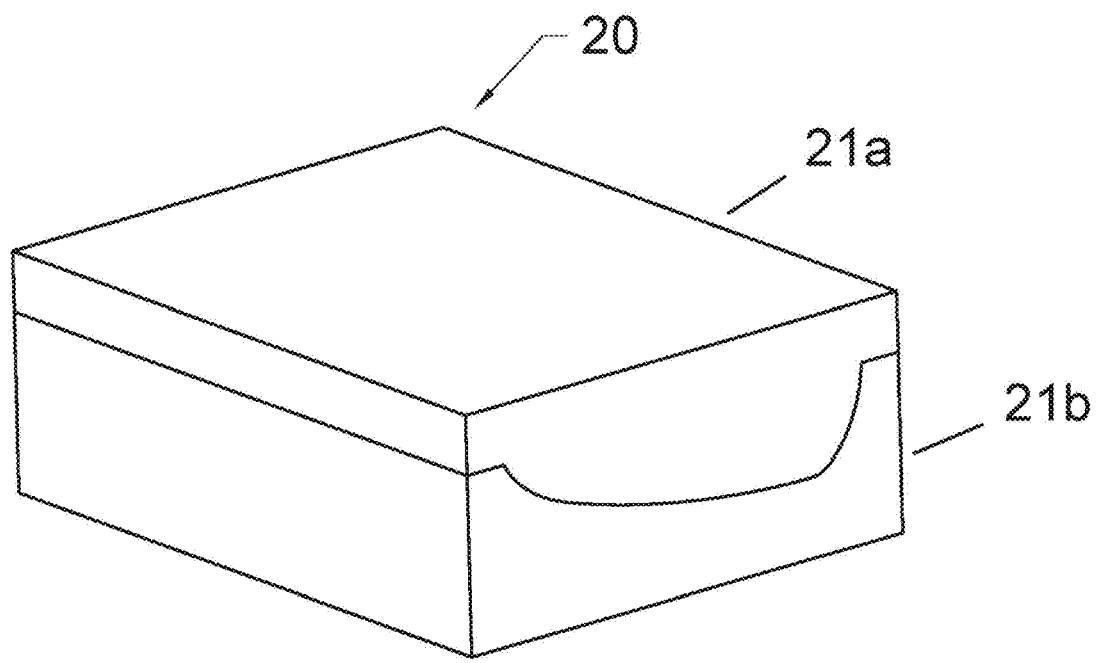

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the disclosure and also means that any particular feature, structure, or characteristic described in connection with one embodiment can be included in any embodiment or can be omitted or excluded from any embodiment. Furthermore, any particular feature, structure, or characteristic described herein may be optional.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

As briefly mentioned above, after an aircraft interior component has been manufactured and is already installed in the aircraft, it becomes much more difficult to apply an adhesive film, especially if the surfaces that will receive the adhesive film are curved, uneven, and/or irregular in shape. Such surfaces are referred to as "curved" and/or "irregular" shape surfaces. This disclosure provides a solution that allows an easy application of a decorative laminate with antimicrobial, antibacterial, and/or antiviral properties to be easily and economically applied to an interior component with a curved and/or irregular shape and provides such solution complying with all applicable airworthiness regulations.

This disclosure may use state-of-the-art antimicrobial and antiviral films with other materials and combinations in order to achieve the desired clean, antimicrobial, antibacterial, and/or antiviral condition for the surface to which the film is applied, while meeting all applicable aircraft airworthiness requirements.

Most aircraft interior component surfaces are combinations of composites and a film of PVF (polyvinyl fluoride) decor laminate or paint that have flame retardants to inhibit fire and smoke in an aircraft. The PVF films are highly chemically resistant and provide a baseline resistance to soil and contamination. This disclosure incorporates fire safety and aircraft safety needs with materials developed for the antivirus and antibacterial conscious market necessary during the current and future pandemics (e.g., SARs-CoV-2), and can be used with future technology such as UVC sanitization, or surfaces with micro-topology that can physically disrupt bacteria and/or viral growth, or manage and control bacteria and viruses by trapping them in channels or groves that can be used to move and control them, or act as a physical barrier for physical transfer from subsequent physical contact.

The described embodiments generally relate to adhesive films that have antimicrobial, antiviral, antibacterial properties, and such films are pre-formed for ease of application to a curved or irregular interior component, all while being certified airworthy. Although this disclosure references such films for use on-board aircraft and other passenger transportation vehicles, it should be understood that this disclosure is not so limited. The disclosed pre-formed adhesive films may be used on any appropriate surfaces that would benefit from such properties being provided in a pre-formed adhesive film.

Figure 2:
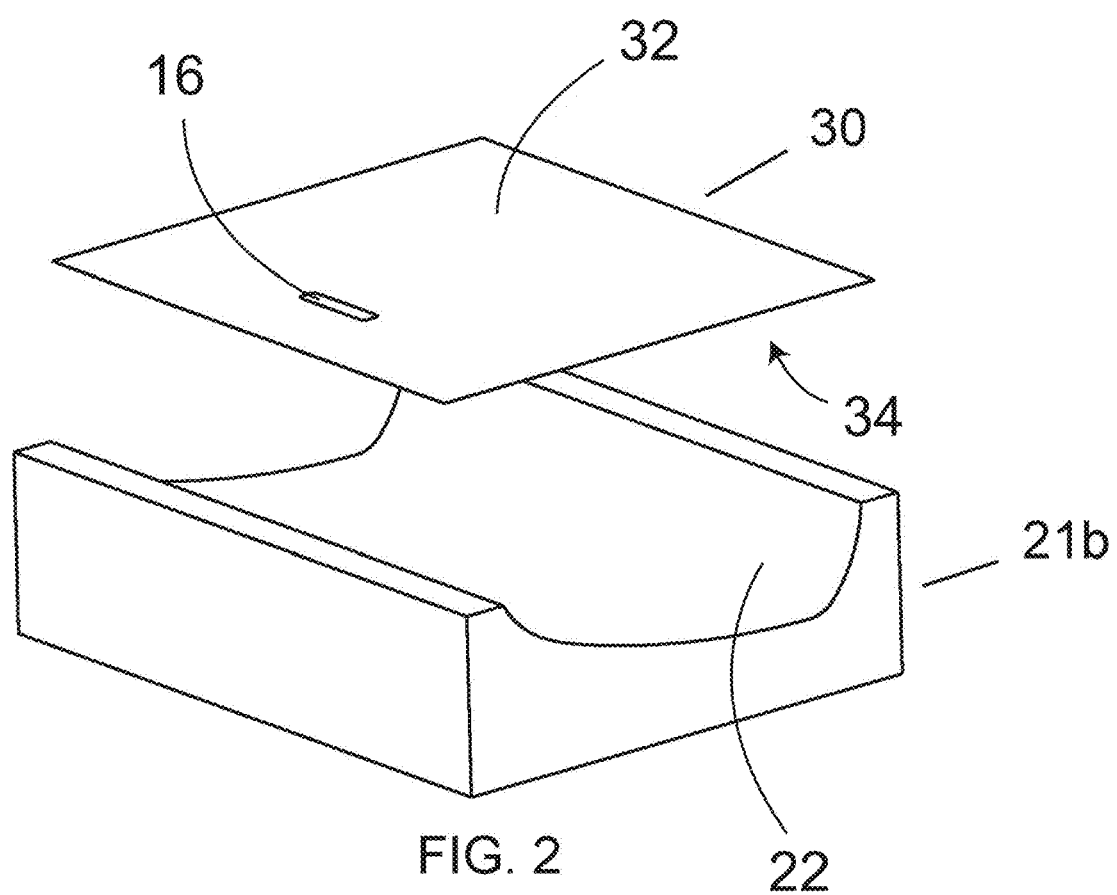
FIG. 2 is a diagram of the bottom half of the contoured manufacturing mold, in the open position, with the adhesive film blank, prior to pre-forming, being inserted.
Figure 3:
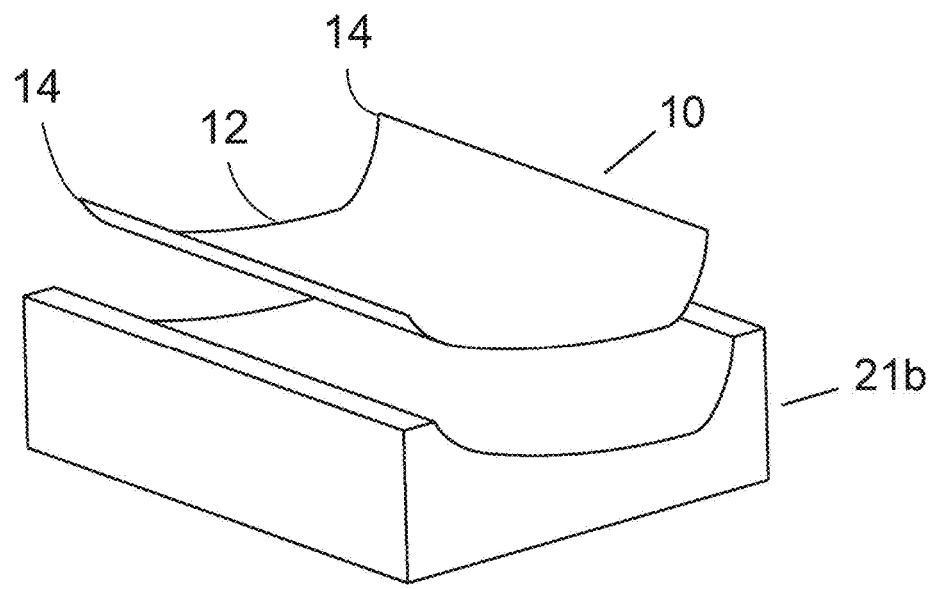
FIG. 3 is a diagram of the bottom half of the contoured manufacturing mold, in the open position, with the pre-formed adhesive film, being removed.
Figure 4:
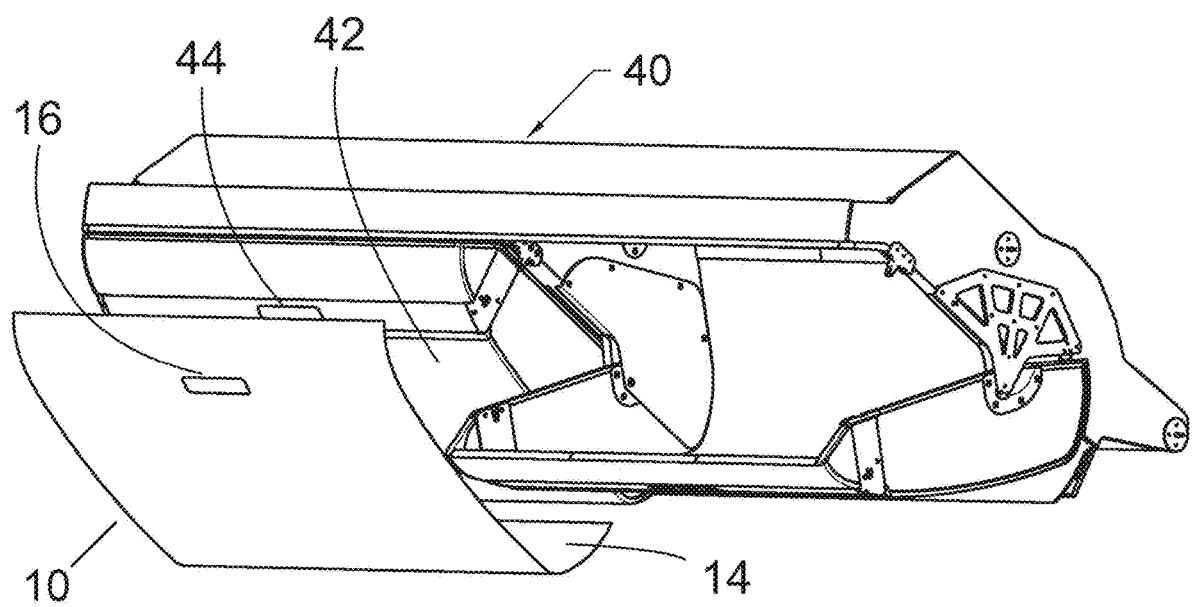
FIG. 4 is a diagram of the pre-formed adhesive film ready for application to the interior component.

Referring now to FIGS. 1-5, a pre-formed adhesive film 10 is created that is in the shape of the interior component 40 upon which it is intended to be installed. This is shown by FIG. 4. The pre-formed adhesive film 10 is dimensionally correct and matched in its length, width, height, and curvature (or other surface feature or irregularity) for the projected surface shape. In order to create such pre-formed adhesive film 10, an adhesive film blank 30 is placed in a contoured manufacturing mold 20, as shown by FIG. 2. The adhesive film blank 30 may be cut from a roll of adhesive film material to the dimensions of the interior component 40 wo which it is intended to be applied. It is possible for the adhesive film blank 30 to have one side with adhesive applied to it, the backing adhesive side 32, and one side with a colored or decorative pattern applied to it, the decorative appearance side 34. In a specific embodiment, the decorative pattern may be present on one or both sides on the blank 30 as it is originally formed, such that the pattern (shapes, colors, contours, or any other desired surface aesthetic) is present on the film blank 30 itself, when formed. However, it should be understood that the decorative appearance may be applied after pre-forming (e.g., if the surface pattern is a carved-in surface contour that would be adversely affected by heat used during pre-forming and/or if the surface pattern is a color layer that cannot withstand heat and/or if the surface has any other feature that would be adversely affected during pre-forming), it may be applied after pre-forming. Similarly, it should be understood that the backing adhesive may be pre-applied to the film blank 30, such that a backing layer simply needs to be peeled off/removed, in order to reveal the backing adhesive side 32. Alternatively, the backing adhesive may be applied to the backing adhesive side after the blank has been pre-formed as described herein.

An exemplary contoured manufacturing mold is shown by FIGS. 1-3. The disclosed contoured manufacturing mold 20 can be the original contoured manufacturing tool used to make the interior component to which the adhesive film blank is to be applied. Alternatively, the contoured manufacturing mold 20 can be a specifically made contoured manufacturing tool that is equivalent in shape to the original manufacturing tool that was used to form the original interior component to which the adhesive film blank will be applied.

Figure 5:
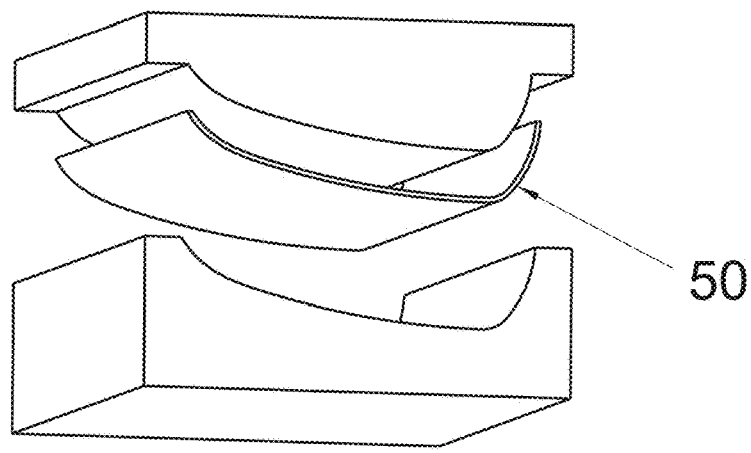
FIG. 5 shows the mold of FIG. 1 with a tooling insert in use.
Figure 5:
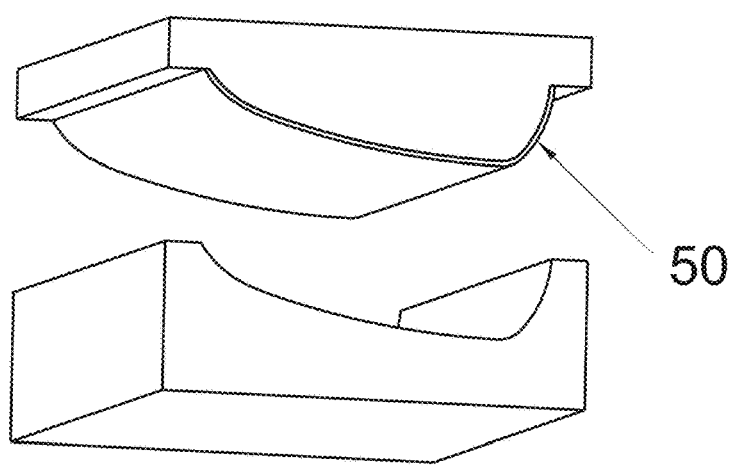

It is possible to provide a tooling insert 50 that can be added to the mold 20 that is the thickness ("T") of the interior component 40 minus the thickness ("t") of the film blank 30 in order have the correct gaps during the forming process. This is illustrated by FIG. 5. The contoured manufacturing tool 20 can then be used in a vacuum, or other equivalent forming process, to form the adhesive film blank 30 into the shape of the interior 22 of the mold, which corresponds to the external shape 42 of the component 40. Once removed from processing in the contoured manufacturing mold 20, the adhesive film blank 30 has now become the pre-formed adhesive film 10, shown by FIG. 3. The film 10 is permanently formed into the desired shape and will not release or flop back into its flat, roll-like, original shape. The film 10 may be manufactured in a thermoforming manner. The forming temperatures used may be approximately the softening point of the fluropolymer/adhesive system selected. In one specific example, temperatures used may range from about 275-350° F.

The time in which the blank 30 is in the mold 20 and subjected to the heat treatment may be any appropriate time required based on the film selected. In one specific example, the time during which the film is subjected to heat and/or pressure treatment may be about 1-6 minutes. It should be understood that these exemplary ranges are provided as examples only, and the temperatures and times may vary depending upon the film material used and the desired end shape.

The pre-formed adhesive film 10 naturally fits over the external surface 42 of the aircraft interior component 40 that is already installed in the aircraft. The thermoformed shape also reduces issues with installation and distortion of the film during the process, as it is formed in a predetermined geometry, and fitted over the interior component's shape. Air bubbles, gaps, or bridging of the film are reduced or eliminated in the process because the interior component can nest in the pre-formed adhesive film.

FIGS. 1-4 show a pre-formed adhesive film 10 and method of making the same that is configured to be installed on an interior component 40. FIG. 1 shows a contoured manufacturing mold 20 in the closed position. Such contoured manufacturing mold 20 has an upper half 21a and a lower half 21b. In an exemplary embodiment, the interior component 40 is an overhead stowage bin. However, it will be appreciated that the interior component can be any type of interior component typically found an aircraft, such as a sidewall panels, ceiling panels, tray tables, door handles, or any other high touch interior surfaces, etc.

In a preferred embodiment, the adhesive film blank 30 has been cut to size and is placed into the contoured manufacturing mold 20 in between the upper half 21a and the lower half 21b. FIG. 2 shows adhesive film blank 30 being placed above the lower half 21b of the contoured manufacturing tool 20. The contoured manufacturing tool 20 has been pre-heated to a specified temperature.

As shown in FIG. 3, the adhesive film blank 30 has been molded into the pre-formed adhesive film 10 by heat and pressure applied by the contoured manufacturing tool 20. In this example, the film 10 has a generally flat surface 12 and curved sides 14. The curved sides 14 correspond in size and shape to curvatures of the interior component 40. As show by FIG. 4, the film 10 may also have one or more index points 16 or prefabricated cut-outs for hardware or assembly features on the interior component. Such index points 16 or prefabricated cut-outs may be provided in the original blank 30 prior to re-molding. In other examples, the index points may be cut into the film 10 once formed. The index points 16 may correspond to a component handle 44 (as shown), may correspond to an indent or other cut away portion of the component, or any other area where at least a portion of the film should not be applied to the component. The index points 16 can help reduce drift in the installation, can improve alignment, and can allow the interior component 40 to nest in the pre-formed adhesive film 10.

As the adhesive film blank is preformed, the contoured tooling mold and the adhesive film blank can be aligned so that the decorative appearance, often demanded of the pre-formed adhesive film, can be installed to align with the decorative appearance of the interior components. There is little to no drift or change from interior component to interior component in the decorative appearance of the pre-formed adhesive blank.

As shown in FIG. 4, the pre-formed adhesive film 10 is shaped to be applied to the interior component 40 which may have an irregular or curved shape. Upon application, the curved surfaces 14 are aligned with corresponding curved surfaces of the component 40. The index point(s) 16 is/are aligned with the corresponding portion (in this case, a handle 44) of the component 40.

As discussed above, airworthiness authorities, such as the FAA or EASA, have developed procedures, regulations, processes and certification requirements to ensure products that are introduced into aircraft are safe and meet all their applicable requirements and regulations. In a preferred embodiment, the interior component 40 has already been certified by the appropriate governmental agency, such as the FAA or EASA. The certification requirements include, but are not necessarily limited to, flammability and weight load certification. Accordingly, in a preferred embodiment, the pre-formed adhesive film 10 compliments such certification, allowing the interior component 40 to remain certified as airworthy by the relevant airworthiness authority. The film 10 can be separately certified or it may be certified along with the interior component 40.

In one embodiment, a low-tact pressure sensitive adhesive completely or partially covers one side of the adhesive film. Additionally or alternatively, a higher tact adhesive, other than (or in addition to) the low tact adhesive, is applied to specific areas on the same side of the adhesive film blank as the low tact adhesive. This allows for the installer to use the low-tact adhesive to position the pre-formed adhesive film 10 in the correct location on the interior component and then press on the high tact adhesive areas to secure the film permanently in place on the interior component. For example, on a specific area of the pre-formed adhesive film, such as an aligning corner, the backing adhesive may be a low-tact adhesive that allows the film to be lifted and realigned as needed to ensure a perfect fit. This low-tact adhesive will not stick so securely to the component that removal creates tearing or bubbling of the film or leaves a residue on the component surface. Instead, the film can easily be lifted and re-positioned via use of the low-tact adhesive. At the same time, the low-tact adhesive has sufficient strength that will allow the film to generally stay in the position where it is placed so that the installer can remove his/her hands and the film should generally stay in the location at which it has been placed and so that other portions of the film can be adjusted as necessary. The low-tact adhesive can be similar in tact level as a paper sticky-note, allowing the sticky note to stick but also to be removed without leaving a residue. As the pre-formed adhesive film is fixed, the backing adhesive in the remaining sections can be high-tact adhesive so that once those high tact areas are pressed, the pre-formed adhesive film can be installed permanently.

In another embodiment, an adhesive with a uniform tact completely or partially covers one side of the film without additional adhesives with a different tact.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples and are not limiting: alternative implementations may employ differing values, measurements or ranges. Any patents and applications and other references noted above, including any that may be listed in accompanying filing papers, are incorporated herein by reference in their entirety.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A pre-formed adhesive film configured to be applied to a projected curved and/or irregular surface, the pre-formed adhesive film comprising a first side, a second side opposite the first side, and a surface extending from the first side to the second side, wherein the surface comprises a curved and/or irregular shape between the first side and the second side, and wherein the curved and/or irregular shape of the surface is self-sustaining such that the pre-formed adhesive film independently comprises the curved and/or irregular shape before the pre-formed adhesive film is applied to the projected curved and/or irregular surface, the pre-formed adhesive film further comprising backing adhesive that comprises both a low-tact adhesive and a high-tact adhesive applied to different areas of the pre-formed adhesive film.

2. The pre-formed adhesive film of claim 1, wherein the pre-formed adhesive film is antimicrobial, antiviral, antibacterial, or any combination thereof.

3. The pre-formed adhesive film of claim 1, wherein the pre-formed adhesive film has a backing adhesive on one surface of the pre-formed adhesive film and a decorative appearance on an opposite surface of the pre-formed adhesive film.

4. The pre-formed adhesive film of claim 3, wherein the pre-formed adhesive film is adhered to an interior component through application of the backing adhesive, the interior component having the curved and/or irregular surface.

5. The pre-formed adhesive film of claim 1, wherein the pre-formed adhesive film is applied to an interior component having the projected curved and/or irregular surface that is installed within a fuselage of an aircraft.

6. The pre-formed adhesive film of claim 1, wherein the low-tact adhesive is on one or more corners of the pre-formed adhesive film.

7. A method for attaching the pre-formed adhesive film of claim 1 to the curved and/or irregular surface, the method comprising the steps of:
 (a) obtaining a sheet of adhesive film,
 (b) cutting the sheet of adhesive film to a size of the projected irregular and/or curved surface the adhesive film is to be applied to,
 (c) placing the cut-to-size adhesive film into a contoured tooling mold,
 (d) heating the cut-to-size adhesive film in the contoured tooling mold to a desired temperature and at a desired pressure in order to form the surface comprising the irregular and/or curved shape, and (e) removing the cut-to-size adhesive film from the contoured tooling mold after forming.

8. The method of claim 7, further comprising the step of applying the formed adhesive film blank to an interior component comprising the curved and/or irregular surface.

9. The method of claim 8, wherein such interior component is contained within a fuselage of an aircraft.

\* \* \* \* \*